(12) United States Patent
Kelly et al.

(10) Patent No.: US 9,701,387 B2
(45) Date of Patent: Jul. 11, 2017

(54) HIGH ALTITUDE GRAVITY ENERGY STORAGE

(71) Applicants: Edmund Joseph Kelly, San Jose, CA (US); Roger Arnold, Sunnyvale, CA (US)

(72) Inventors: Edmund Joseph Kelly, San Jose, CA (US); Roger Arnold, Sunnyvale, CA (US)

(*) Notice: Subject to any disclaimer, the term of this patent is extended or adjusted under 35 U.S.C. 154(b) by 4 days.

(21) Appl. No.: 14/104,126

(22) Filed: Dec. 12, 2013

(65) Prior Publication Data
US 2015/0166165 A1    Jun. 18, 2015

(51) Int. Cl.
| F02B 63/04 | (2006.01) |
| B64B 1/50 | (2006.01) |
| H02S 10/00 | (2014.01) |
| H02S 30/20 | (2014.01) |
| H02S 10/20 | (2014.01) |
| B64B 1/08 | (2006.01) |

(52) U.S. Cl.
CPC ............... B64B 1/50 (2013.01); H02S 10/00 (2013.01); H02S 10/20 (2014.12); H02S 30/20 (2014.12); B64B 1/08 (2013.01); Y02E 10/50 (2013.01)

(58) Field of Classification Search
CPC .... B64B 1/40; B64B 1/42; B64B 1/50; H02S 20/00; H02S 10/00
USPC .......... 244/31–33, 2, 3, 158.2, 30, 115, 116; 104/22; 136/292; 290/1 A, 44, 55
See application file for complete search history.

(56) References Cited

U.S. PATENT DOCUMENTS

| 6,811,115 | B2* | 11/2004 | Kurose .......................... 244/97 |
| 8,166,760 | B2 | 5/2012 | Fiske |
| 2009/0229656 | A1 | 9/2009 | Tillotson |
| 2010/0018566 | A1* | 1/2010 | Jackson ....................... 136/246 |
| 2010/0107627 | A1 | 5/2010 | Morgan |
| 2011/0180057 | A1* | 7/2011 | Page et al. .................... 126/600 |
| 2012/0085984 | A1 | 4/2012 | Daya |
| 2012/0097211 | A1* | 4/2012 | Gurfil et al. .................. 136/246 |
| 2012/0235410 | A1* | 9/2012 | Serrano .......................... 290/50 |
| 2013/0264413 | A1* | 10/2013 | Aoki et al. ..................... 244/33 |

FOREIGN PATENT DOCUMENTS

| CN | 2307111 Y | 2/1999 |
| WO | WO 2012/151388 A1 | 11/2012 |

* cited by examiner

*Primary Examiner* — William Gilbert

(57) ABSTRACT

The present invention is realized by apparatus and methods for harvesting, storing, and generating energy by permanently placing a large rigid buoyant platform high in the earth's atmosphere, above clouds, moisture, dust, and wind. Long, strong and light tethers can connect the buoyant structure to the ground which can hold it in position against wind forces. Weights suspended from the buoyant platform with cables are raised and lowered by electric winches to store and release gravitational potential energy. High voltage transmission lines electrically connect the platform to the earth's surface. Electrical energy from the high voltage transmission lines or from photovoltaic arrays on the platform can be stored as gravitational potential energy and subsequently released as electricity from generators driven from the stored gravitational potential energy and used on the platform or transmitted via the high voltage transmission lines.

2 Claims, 10 Drawing Sheets

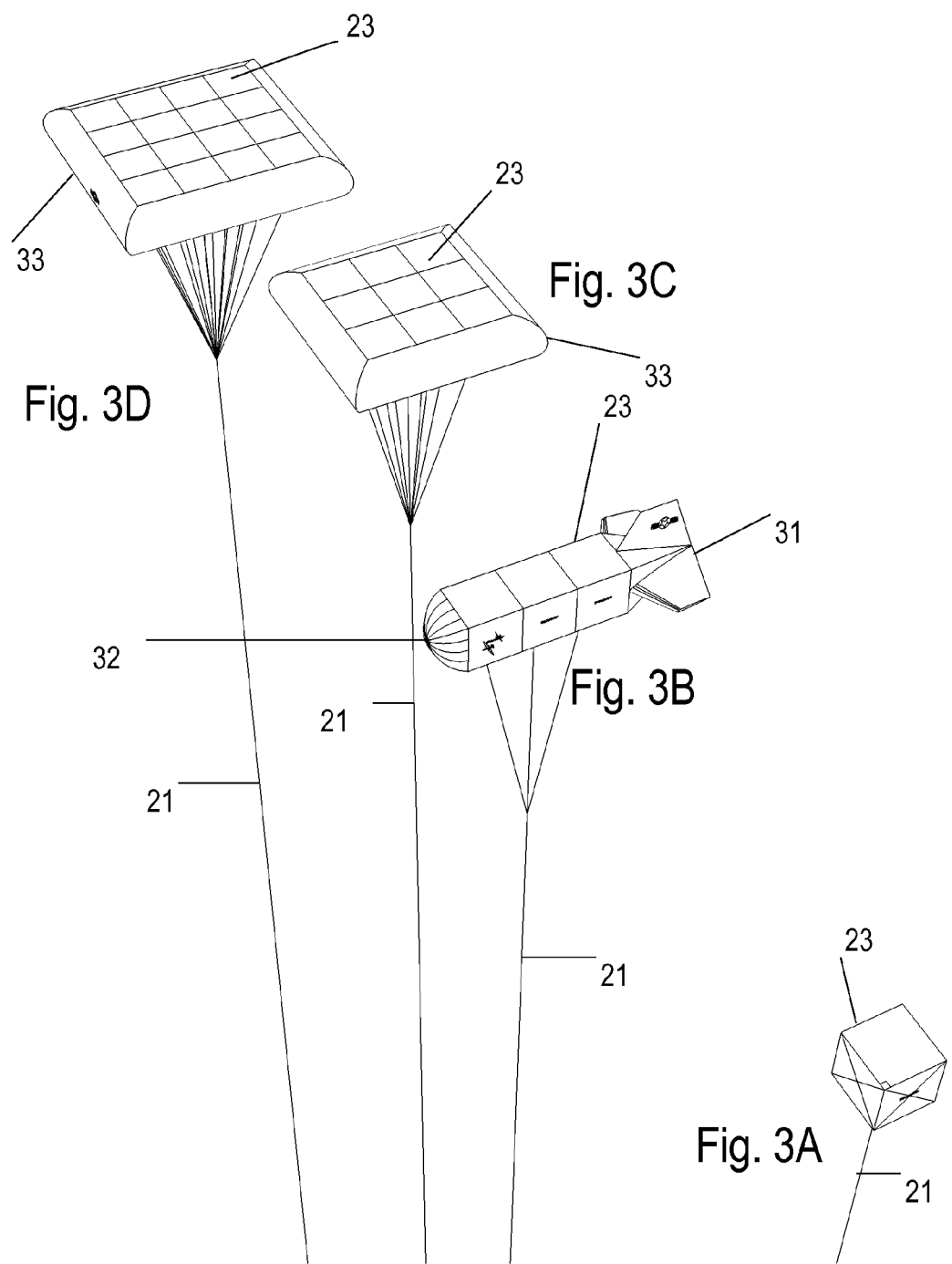

HIGH ALTITUDE GRAVITY ENERGY STORAGE

CROSS-REFERENCE TO RELATED APPLICATIONS

Non-provisional application Ser. No. 13/781,549, filed on Feb. 28, 2013. Non-provisional application Ser. No. 13/831,004, filed on Mar. 14, 2013.

FEDERALLY SPONSORED RESEARCH

Not Applicable

SEQUENCE LISTING OR PROGRAM

Not Applicable

BACKGROUND

Field

This invention generally relates to energy storage and more particularly gravity energy storage.

Prior Art

An area of prior art is gravity energy storage. This uses mechanical energy to raise a mass through a height, storing energy as gravitational potential energy. Energy is subsequently retrieved by lowering the mass. The most common form is pumped storage hydroelectricity which uses an electric motor to drive a pump and transport a mass of water from a low altitude reservoir up a hill to a high altitude reservoir in order to store energy. Electrical energy is subsequently recovered as water flows back down the hill driving a turbine that drives a generator.

On a smaller scale the original "grandfather" clocks used human mechanical energy to raise weights and store it as gravitational potential energy. As the weights slowly descended the recovered mechanical energy powered the mechanical clocks.

Because of the perceived need for energy storage solutions to complement intermittent alternative energy sources such as wind and solar energy there are several new gravity storage ideas being pursued, though none have yet been deployed. These include using buoyancy in the ocean as taught in US patent US20100107627, various means of transporting mass as rock or gravel up a height using continuous mechanical conveyors of containers and subsequently bringing the mass back down as taught in CN2307111, and giant pistons, usually made of rock as taught in US20120085984.

As with all energy storage solutions the central problem is cost. A commonly perceived cost goal for economic viability is $100/kWh capital cost. There is as yet no energy storage solution that is close to achieving this goal. Most of the various forms of existing and proposed gravity energy storage also suffer from geographic constraints that limit their scale and/or location.

Another area of prior art is buoyant airships and balloons that float in the atmosphere.

Balloons float freely without propulsion and are constructed from gas tight flexible membranes, usually thin plastic like polyethylene. They contain a lighter than air gas, sometimes pressurized and sometimes unpressurized. A commonly used terminology is "zero-pressure" for unpressurized balloons and "super-pressure" for pressurized balloons. Free floating balloons of both types are typically exploited for tracking weather or for scientific purposes. The largest balloons have volumes of about 1 million cubic meters and can float in the stratosphere at altitudes exceeding 40 km. They are fragile, carry small payloads and are used for one flight.

Airships have an aerodynamic shape and a means of propulsion and are categorized as rigid, semi rigid or blimps.

Blimps, like the Goodyear blimp, use a gas tight membrane filled with a pressurized lighter than air gas to provide a combination of buoyancy, structural rigidity, protection from weather and an aerodynamic shape. This means of construction combined with the limited strength of available membrane materials has limited the scale of blimps to a volume of a few thousand cubic meters. Blimps either have a means of propulsion or they are tethered to the ground. A tethered blimp lacking means of propulsion is usually called an aerostat. Because of their limited volume, all blimps and aerostats have been confined to the denser air environment of altitudes below 10 km in the troposphere. This is because as the air becomes less dense with altitude, a given volume provides less buoyancy. Blimps have heavy propulsion systems, fuel and passenger or equipment payloads all of which have to be supported by buoyancy. Aerostats lack propulsion systems, but have tethers that are at least as heavy. In both cases it has proven impractical to provide sufficient buoyancy or a sufficiently light blimp to enable operation in the low stratosphere.

Rigid airships are constructed with a rigid framework that provides structural rigidity and aerodynamic shape and contain zero pressure gas bags within the rigid framework to provide buoyancy. This means of construction has enabled the construction of large craft with volumes exceeding 100,000 cubic meters. Rigid and semi rigid airships have all been powered aircraft. Airships have only operated at altitudes well below 10 km. To build airships that could operate at higher altitude involves building very much larger craft. The engineering and operational constraints of doing this combined with the lack of an economic or military demand have meant that this option has never been explored.

The earth's atmosphere in the low stratosphere in the region of 20 km altitude has benign weather properties over most of the earth's surface below latitude 60 degrees that make it attractive for long endurance operation. This has been exploited by reconnaissance aircraft like the U2 and Global Hawk. Weather we are familiar with is confined to the troposphere which extends up to an altitude from about 8 km to 12 km with a gradual transition to the stratosphere called the tropopause. The high winds of the jet stream occur at the tropopause. There is no moisture or clouds in the stratosphere and turbulent weather patterns like thunderstorms and hurricanes do not reach high enough to have effect at an altitude of 20 km. This is well illustrated by flights by U2 and Global Hawk over hurricanes for weather research. Winds are steady and horizontal, mostly less than 20 meters per second, with small episodic periods in winter of a few weeks every few years where they can reach 50 meters per second due to excursions of the polar vortex which circles the poles in the stratosphere in winter.

The permanently benign weather properties of the atmosphere in the region of 20 km altitude in the low stratosphere make it a distinct and separate operational environment which enables practical long endurance operation as evidenced by the U2 and global hawk aircraft. The unique low air pressure, low air density environment requires unique aircraft designed to operate there. Conventional aircraft are designed to operate at lower altitudes up to around 12 km, and their aerodynamics and propulsion systems cannot operate at altitudes around 20 km. There have been attempts at building long endurance high altitude airships to fly at 20 km altitude and above, but none have as yet succeeded due to the difficult engineering challenges of limited buoyancy posed by the thin atmosphere. In the class of buoyant aircraft, only un-tethered and un-powered free floating weather and research balloons have operated in the stratosphere.

No prior art airship or aerostat has been designed to stay aloft on a permanent basis. Endurance is measured in weeks for airships and months for aerostats. They both have limited endurance and both must avoid bad weather.

In summary all prior art mechanisms that float in the atmosphere have been relatively small scale and short endurance and almost all have operated in the troposphere. There have been no tethered buoyant rigid structures operated in the atmosphere at any altitude.

Another feature of high altitude operation in the low stratosphere is the large distance to the horizon. From an altitude of 20 km, the horizon is approximately 550 km distant. This means that observation or communication technologies that are confined to "line of sight" operation can cover a wide area from this altitude. This includes active technologies like radars, laser and radio communications, and passive optical and radio surveillance. The air is clear at 20 km which enables uninterrupted and secure laser light communication between platforms and between platforms and spacecraft. There have been proposals for long endurance high altitude aircraft or airships to "station keep" and act as communications and observation hubs, but the operating constraints have proven too difficult. They would use solar energy during daylight hours with batteries storing energy for nighttime. Providing sufficient energy to station keep in the worst case winds of around 50 m/s has proven impractical.

Another feature of the environment in the low stratosphere is sunlight is more intense. Atmospheric scattering is much reduced due to the much smaller mass of air in the optical path, especially at lower sun elevation angles. This results in higher daily solar energy incident on a surface. This can exceed a factor of three or more times ground level solar energy at the same location depending on latitude and tracking. Also solar energy is totally predictable as it is not interrupted by weather or dust.

Photovoltaic solar energy systems use solar cells to convert solar energy directly into electricity. The solar cells are usually connected together in panels, which in turn are mounted on mechanical supports and connected together to form arrays. Associated with the photovoltaic panels are electrical elements such as conductors, voltage converters, combiners, fuses, relays surge protectors and inverters used to combine the power from the collection of photovoltaic panels into a single power output.

Current photovoltaic electricity systems suffer from several problems. Their high capital costs make the cost of the energy they produce uncompetitive without subsidy.

The power produced by photovoltaic panels varies by more than a factor of two depending on their geographic location. Large-scale systems in the best sunny geographic locations also have high ancillary costs to compensate for the long transmission distance from the system to the average power user.

Photovoltaic arrays need to have large entry apertures to produce meaningful amounts of power. Utility scale systems have apertures measured in millions of square meters. Current systems consequently consume large areas of land and significant quantities of construction materials like glass and steel needed to fabricate this large aperture array.

Weather in the form of clouds, dust, wind, rain, hail, frost and snow make power generation unpredictable and require that structures be strong and durable which adds significantly to their cost. Typical design wind loads are around 2000 Pa and mechanical snow loads are around 5000 Pa.

Some current large scale systems use large arrays of individually steered collecting elements. Robust mechanical support, motors, gears, electrical equipment etc are needed for each collector element, contributing significantly to overall cost.

The cost problem is compounded by the generally low overall energy conversion efficiency of current systems, which consequentially requires a larger surface area and more material to produce a given power output compared to higher conversion efficiency systems.

There have been some proposals to attach cells to tethered aerostats to generate power. These have all proposed current small scale aerostats tethered at relatively low altitudes in the troposphere. None of these proposals have been reduced to practice because of practical constraints that make them unrealistic. At all altitudes in the troposphere, weather can be severe and the durability of current aerostat technology is poor. The small scale of aerostats mean that they can at best only provide a small amount of power, and many thousands would be needed to provide power at a utility scale of hundreds of mega Watts. They would need to be spaced far apart to avoid colliding. There would be a constant need to winch them down for maintenance and to avoid weather.

SUMMARY

The present invention is realized by apparatus and methods for placing a large rigid buoyant platform high in the atmosphere, above clouds, moisture, dust, and wind. Long, strong and light tether(s) can connect the buoyant structure to the ground which can hold it in position against wind forces. The platform can serve several uses, either individually or in any combination. These uses include gravity energy storage implemented by using energy to power winches and cables to raise weights supported by the platform buoyancy to a high altitude, thus storing energy as gravitational potential energy and subsequently lowering the weights recovering the stored energy. Electricity output from a photovoltaic array attached to the platform can be stored on the platform as gravitational potential energy and can also be coupled to high voltage transmission line(s) which connect from the platform to the earth's surface. The high voltage transmission lines can also be used to deliver energy from the ground to gravity energy storage on the platform or from gravity energy storage on the platform to the ground.

These and other objects and features of the invention will be better understood by reference to the detailed description which follows taken together with the drawings in which like elements are referred to by like designations throughout the several views.

DRAWINGS-FIGURES

FIG. 3A is a simplified perspective view of the buoyant platform module shown in FIG. 1 and FIG. 2.

FIG. 3B is a perspective view of a small platform assembled from three of the platform modules shown in FIG. 3A with an added inflated nose cone and tail section.

FIG. 3C is a perspective view of a small platform assembled from nine of the platform modules shown in FIG. 3A with an added inflated aerodynamic edge.

FIG. 3D is a perspective view of a small platform assembled from sixteen of the platform modules shown in FIG. 3A with an added inflated aerodynamic edge.

DRAWINGS-Reference Numerals

| | |
|---|---|
| 11 strut | 12 cable cross brace |
| 13 top surface structure | 14 top surface section |
| 15 photovoltaic panel top surface | 16 interior gas bag |
| 21 tether-HV cable | 22 winch |
| 23 platform module | 31 inflated tail section |
| 32 inflated nose section | 33 inflated edge section |
| 41 9 module small platform | 61 deployment boom |
| 62 16 module, small platform | 63 in guides or rails |
| 71 16 module, small platform | 72 across guides or rails |
| 73 large platform made of 81, small platforms | |
| 80 PV panel array | 81 Electrical power conversion |
| 82 electrical motor-generator | 83 motor-gearbox shaft |
| 84 gearbox-brake | 85 gearbox-reel shaft |
| 86 gravity cable reel | 87 gravity cable |
| 88 gravity storage weight | |

GLOSSARY

The specification uses several standard definitions throughout to avoid ambiguity. These related definitions are tied to specific aspects of the description.

Platform module: the standard and smallest unit of platform construction.

Small platform: An assembly of platform modules.

Large platform: An assembly of small platforms.

DETAILED DESCRIPTION

Figure 1:
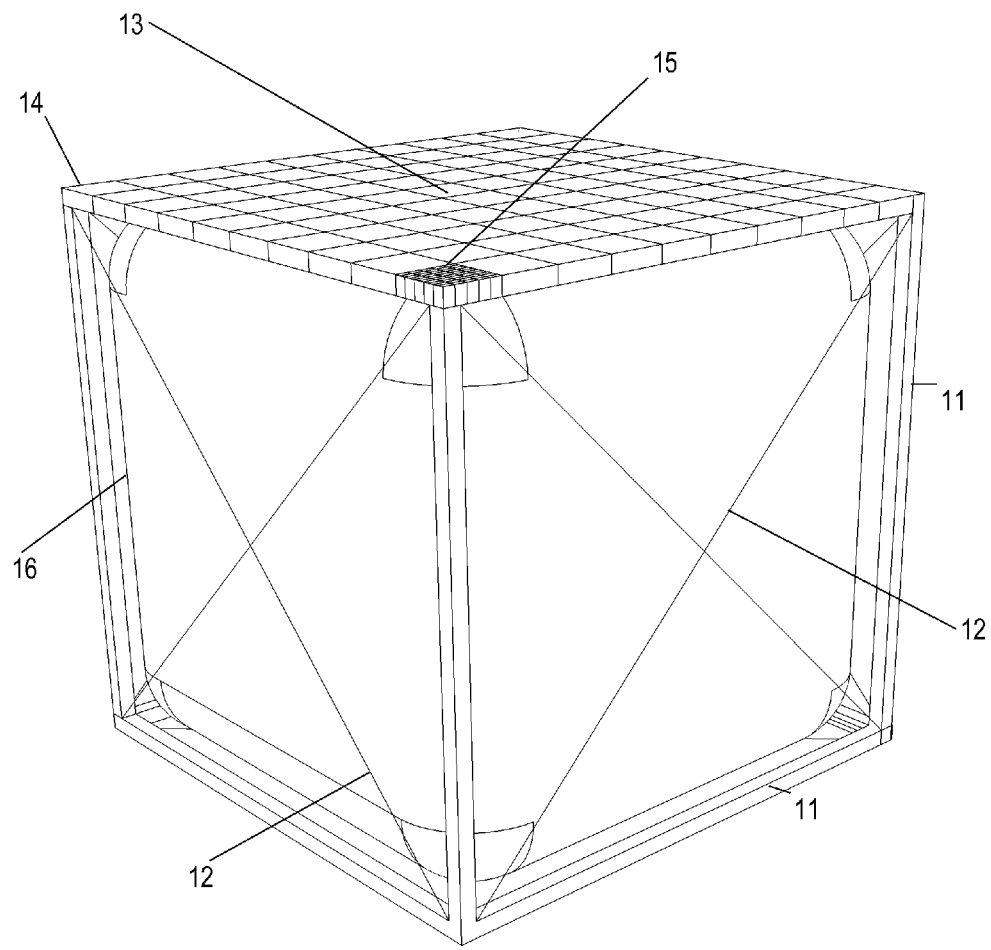
FIG. 1 is a perspective view of a platform module designed in accordance with the present invention.

FIG. 1 shows a perspective view of a buoyant platform module 23 designed in accordance with the present invention. It consists of a rigid framework formed from struts 11, top surface 13 and cross bracing cables 12. The interior of the framework holds a gas bag 16, which contains the buoyancy gas, commonly hydrogen or helium. The top surface 13 is assembled from smaller structural sections 14. The top surface of each structural section 14 can support an array of photovoltaic panels 15 that can either partially or completely cover the top surface 13. The photovoltaic panels 15 are connected electrically with wires, DC-DC voltage converters, combiners and electricity distribution hardware to provide high voltage (HV) power output from the platform. This HV output can be AC or DC. In this embodiment when fully assembled, the overall structure is a rigid cross braced cube. The length of the cube is in the region of 100 meters. The dimensions are set by the buoyancy available at the design altitude. The module buoyancy supports the mass of the module and the wind loads. The buoyant platform module 23 described can be used as a module in a modular construction system or method used to build larger buoyant platforms from assemblies of modules. For simplicity in the description we subsequently refer to these cubic buoyant platform modules as platform modules. Embodiments are not restricted to cubes, and other geometric forms are feasible. A particular variant has a height that is different than the width. This allows a simple change in vertical strut length and gas bag height to provide different buoyancies. This allows embodiments with different payloads or operational altitudes to be easily constructed.

Equipment and materials need to operate within the environmental constraints of the low stratosphere. Air pressure is about 8000 Pa which affects buoyancy and the breakdown voltage. The air temperature is around −60 degrees Celsius, and the ozone concentration is around 2.8 ppm. These affect the choice of materials, particularly plastics that may become more brittle or suffer damage. The struts and top surface are lightweight, rigid truss frameworks, typically formed from aluminum. The gas bag is typically a thin plastic membrane. A commonly used material is polyethylene film around 25 microns thickness. The membrane may be a laminate or co-extrusion of several plastic and metal materials to provide properties such as low buoyancy gas permeability, protection from ozone, weldability and strength.

Photovoltaic panels are of lightweight construction, typically weighing about 2 kg per square meter or less. Various photovoltaic cell technologies can be employed including commonly used crystalline and polycrystalline silicon. Given the predominance of direct solar radiation in the low stratosphere, concentrating photovoltaic panels that need to track the sun may benefit. Photovoltaic panel materials need to handle the cold and the UV, particularly the cell encapsulant material. Silicone is one good choice. Compared to photovoltaic panels on the ground, the need for water based weather protection is reduced as there is no water in the low-stratosphere operating environment. Ground based photovoltaic panels as well as handling water based weathering, also have to handle snow loads of around 5000 Pa, hail, regular washing, and maximum wind loads of around 2000

Pa. In contrast, in the low-stratosphere there is no hail, snow, or significant dust, and maximum wind loads are about 125 Pa to 150 Pa, so photovoltaic panels can be simpler and less robust. photovoltaic panels are highly reliable, and the absence of water based weather degradation and the low operating temperature will enhance this reliability in the low-stratosphere.

Arrays of photovoltaic panels 15 can be formed in the same ways they are on the ground. The simplest form is a flat array covering the surface. Single fixed axis, one axis tracking and two axis tracking are all also possible. Because the structural array has a cost per unit area, optimizing the area usage is more important than with ground based photovoltaic arrays, and is similar to ground based commercial photovoltaic systems on roofs that want to optimize the electricity generated for the roof area. As with ground based photovoltaic arrays, detailed cost analysis based on the cost of photovoltaic panels, the additional costs of tracking apparatus and the geographic location determine what is the most cost effective array form to deploy.

Embodiments of platform modules may not cover the entire surface with a photovoltaic array 15, or even any photovoltaic panels. As part of a larger platform they may serve other roles, such as providing active and passive fire safety, by providing fire suppressants or acting as a non flammable fire break.

They may also support other payloads such as winches and weights to implement gravity energy storage. They may also support wireless or laser communication systems for communication with the ground, space, or other stratospheric platforms. They may also support radar systems for uses such as monitoring weather, air traffic control and military uses. Other military uses include use as a weapons platform carrying missiles, direct energy laser weapons or drone aircraft. They may also support observation systems such as space telescopes and ground monitoring. They may also support scientific payloads.

Many of these uses are enabled or enhanced by the permanence of the platform, the large payloads that can be carried and the large and permanent electrical power that is available. Payloads of hundreds of tonnes are possible and power of many hundreds of mega watts are available. Night time power can be provided from electricity storage on the platform from batteries or gravity storage or from the electricity grid on the ground.

Figures 2A, 2B:
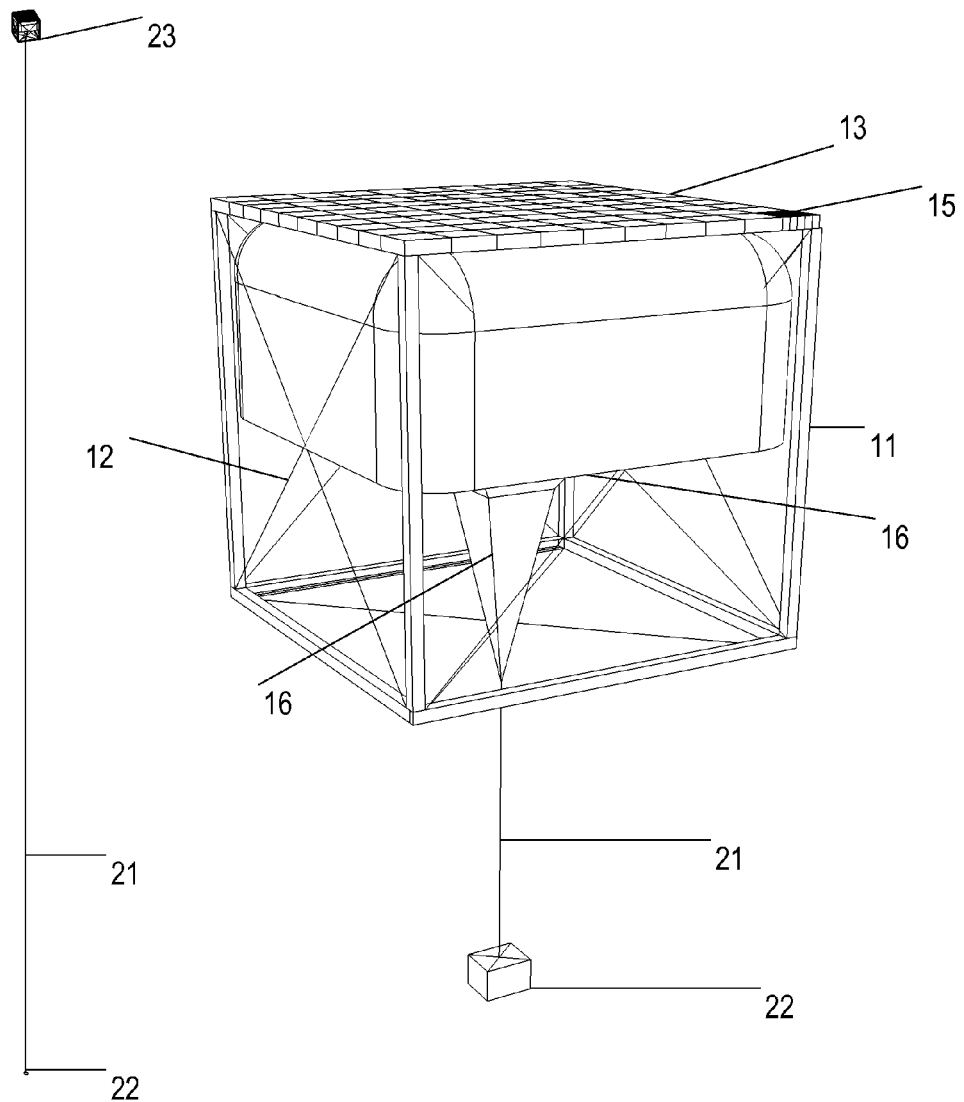
FIG. 2A is a perspective view of a buoyant platform module with an attached tether and winch designed in accordance with the present invention.
FIG. 2B is a perspective view of a platform module designed in accordance with the present invention at high altitude.

FIG. 2A shows a different perspective view of the platform module shown in FIG. 1. The module is the same as in FIG. 1 with the addition of tether/HV cable 21 and winch 22. The module is shown during deployment, floating at about 100 meters altitude and being held by the tether/HV cable 21. The gas bag 16 is shown in a partially inflated condition. As the module rises in altitude and atmospheric pressure reduces, the gas bag expands. Sufficient buoyancy gas is added to the gas bag such that it is nearly fully inflated at a nominal operational altitude of about 20 km. Throughout this specification reference to 20 km altitude is meant to be interpreted as approximately 20 km. The low stratosphere varies in altitude and the precise operational altitude of platforms will vary by location, and perhaps by season. The tether may include the High Voltage (HV) cable that carries power from the module to the ground or from the ground to the module when necessary, such as during the night. The tether is strong and lightweight and typically made from an aramid fiber such as Kevlar. For efficiency and simplicity the high voltage is typically direct current (HVDC). The combination of high voltage transmission and aluminum conductors keeps the HV transmission cable lightweight.

FIG. 2B shows the platform module deployed to a high altitude, on its way to operational altitude. Winch 22 is playing out the cable 21. The platform 23 is shown in detail in FIG. 1.

Compared to prior art airships and aerostats, a novel and necessary feature of the platform module 23 described above is the scale. The basic 100 meter cube module 23 has an approximate buoyancy volume of 1,000,000 cubic meters, which far exceeds the 200,000 cubic meters of the Hindenburg, still the largest airship ever built. The scale is necessary because the air at 20 km altitude is very thin and a ratio of volume to top surface area of about 100 is needed to carry the structural weight and HV cable and platform wind loads resisted by the tether. Only flimsy disposable balloons for science research in the high stratosphere have approached 1,000,000 cubic meters in volume.

The rigid framework provides the support structure for the photovoltaic panels and carries the wind induced loads. A simple zero pressure gas bag needs no control mechanisms to adjust for pressure changes and as an example the buoyancy gas leakage for a gas bag of these dimensions constructed with 25 micron aluminized PET membranes is considerably less than 1% a year. For platforms with a design life of 20 to 30 years, buoyancy gas may not have to be replenished for the life of the platform. Endurance measured in decades is more accurately described as a design life, a term normally applied to structures such as buoyant ocean platforms or bridges.

FIGS. 3A, 3B, 3C and 3D show small platforms assembled from platform modules 23. FIG. 3B shows a small platform constructed from three mechanically connected platform modules 23 with an attached inflated nose 32 and tail 31. The tether 21 attaches to each platform module to distribute the mechanical load and combine the HV power output from each platform module. FIG. 3C shows a small platform constructed from nine mechanically connected platform modules 23 with an attached inflated rounded aerodynamic edge 33. FIG. 3D shows a sixteen platform module 23 small platform with an inflated rounded aerodynamic edge 33. Inflated edge 33, nose 32 and tail 31 are each gas-tight, light-weight fabric containers filled with pressurized gas, most commonly air. The gauge pressure might be in the region of 300 Pa to 500 Pa. Commonly used fabrics are laminates of materials that provide various properties. An example of such a laminate might have an exterior layer of polyvinyl fluoride film for protection from weather, a layer of polyester fabric for strength and an inner layer of polyurethane film for gas tightness.

Each of these small platforms are assembled on the ground and then deployed to 20 km altitude similar to as shown in FIG. 2B. FIGS. 3A, 3B, 3C and 3D show small platforms deployed as small stand alone power plants. The sixteen platform module, small platform shown in FIG. 3D measures about 400 meters on a side. The difficulty of manufacturing and deploying larger assemblies of platform modules 23 leads to the method shown in FIG. 4.

Figure 4:
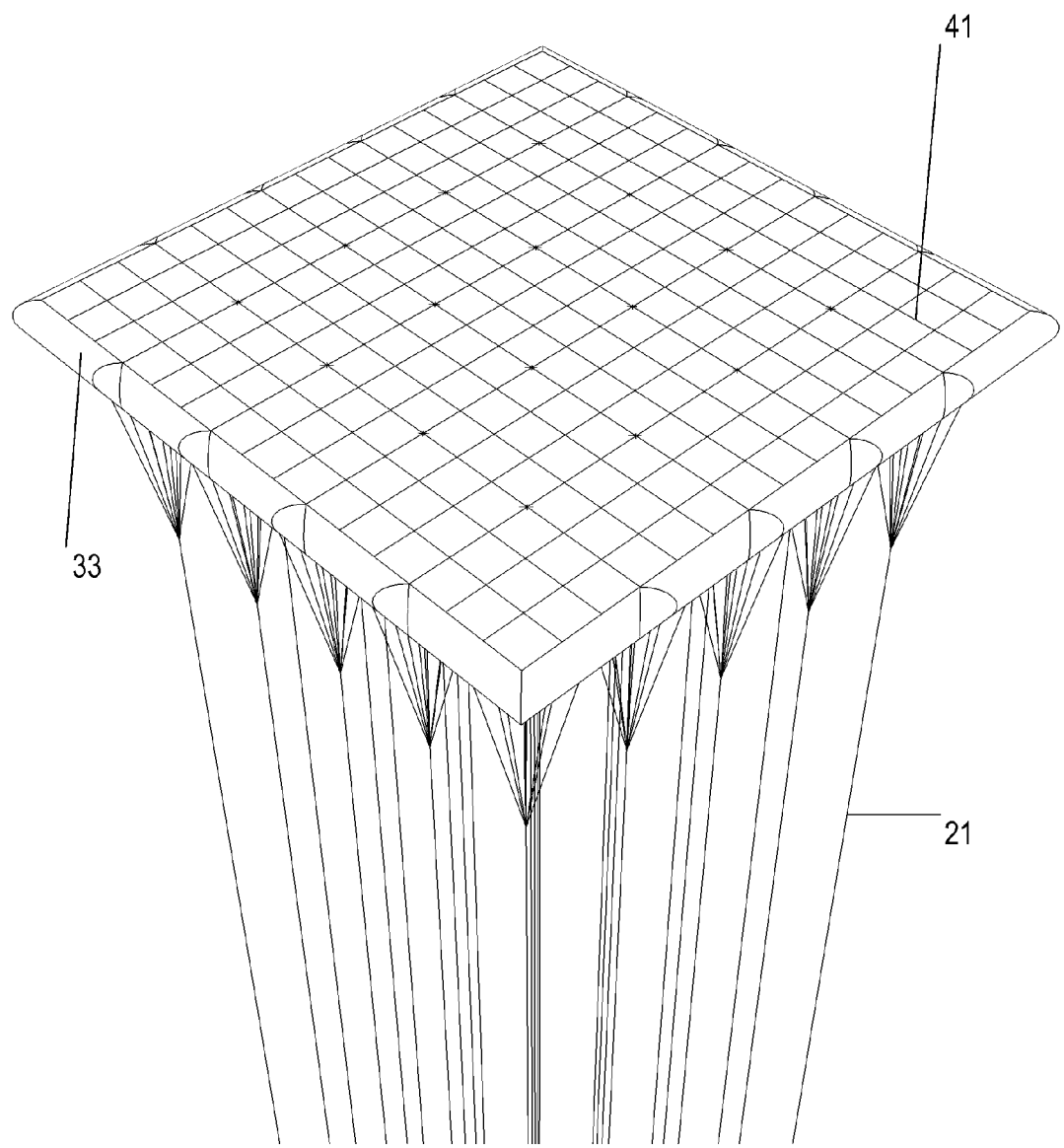
FIG. 4 is a perspective view of a large platform assembled from twenty five of the nine platform module, small platform elements shown in FIG. 3C with an added inflated aerodynamic edge.

FIG. 4 shows a large platform composed of 25 of the small platforms, each constructed from 9 platform module assemblies 41 shown in FIG. 3C, mechanically connected together and deployed at 20 km altitude. As can be seen each small platform 41 has its tether/HV cable 21 attached. Each small platform 41 is individually assembled on the ground and then deployed to 20 km altitude using its own tether/HV cable 21 and winch 22. On its ascent, each small platform 41 is guided by attached booms that connect to adjacent tethers of previously deployed small platforms 41 and use them as guides and for horizontal support. This ensures that the deploying small platforms 41 do not collide with adjacent tethers and also the adjacent tethers provide mechanical support to help the deploying small platforms 41 resist wind loads. It also ensures that small platforms 41 can be simply and accurately guided into their mating position within the larger platform where they can be mechanically connected to become part of the larger platform structure. This process is reversed to bring small platforms 41 down to the ground for maintenance or repair. The large platform only ever exists at 20 km altitude and only small platforms 41 are handled on the ground. This terminology distinguishing between small and large platforms is standardized in this description. Large platforms are always assembled from small platforms at altitude in the low stratosphere. Small platforms are always assembled on the ground from platform modules.

The large platform shown in FIG. 4 has 25 tethers. This provides directional stability and redundancy. Compared to a single small platform 41, the large platform has 25 times the buoyancy, but only five times the frontal area, and so is deflected far less in high winds. As large platforms grow, this effect continues and platforms become more stable and redundant.

Figure 5A:
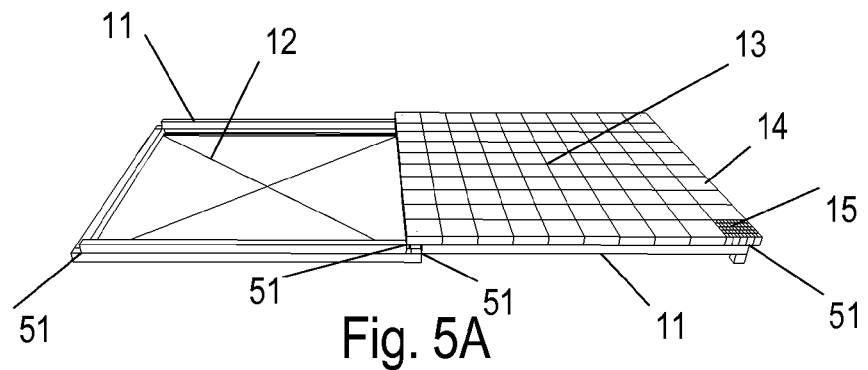
FIG. 5A is a perspective view of a platform module assembled folded flat on the ground.
Figure 5B:
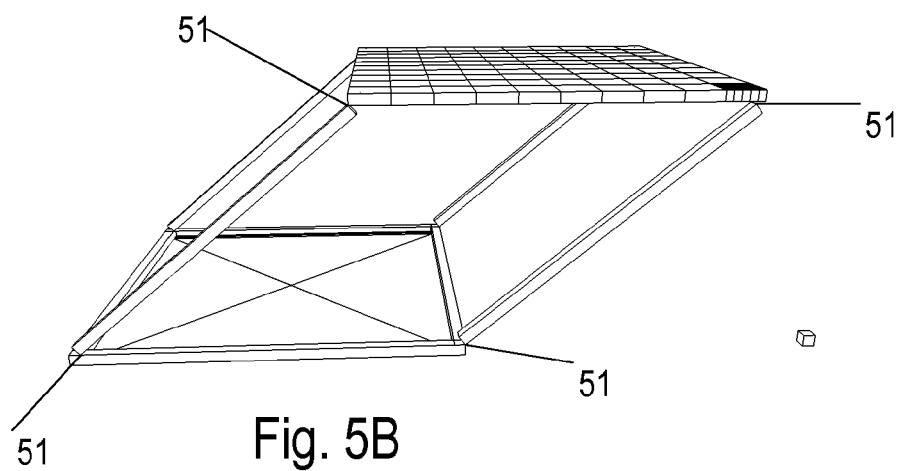
FIG. 5B is a perspective view of a platform module unfolded to about 30 degrees.
Figure 5C:
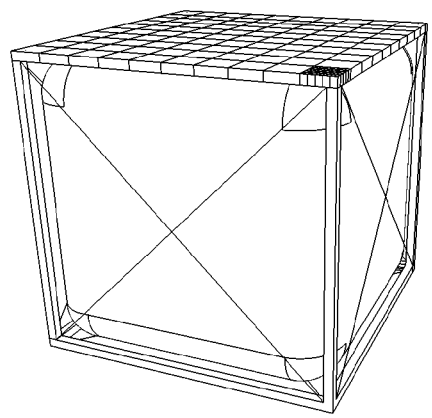
FIG. 5C is a perspective view of a platform module fully unfolded to vertical with cross bracing and gas bag added.

FIGS. 5A, 5B, and 5C illustrate part of a method to construct a platform module 23. FIG. 5A shows the module structure assembled folded flat on the ground. This allows construction and assembly to occur conveniently at ground level. When the assembly of the structure including all and electrical assembly is complete and tested at ground level, the structure is unfolded to its final cubic configuration. Hinged joints 51 at the eight vertices of the cube connect the structural elements and enable the unfolding from flat to cubic. The forces used to raise the structure could be cables and pulleys which are not shown. FIG. 5B shows an intermediate position as the module is unfolded. FIG. 5C shows the final position where the joints have been rigidly connected and the hinges are locked and no longer operate. The cross bracing has been added and the gas bag is shown added and inflated. This method of deploying the gas bag within the rigid protective structure greatly simplifies the deployment of such large fragile elements that could easily be damaged by simple contact with the ground as a result of a sudden gust of wind.

The method shown can be easily extended to unfold multiple joined platform modules from a folded flat position using hinges at the vertices of each cube. These small platforms can then be deployed to high altitude and joined to form a single large multi element structure using the method described in the description for FIG. 4 and FIG. 7.

Another embodiment of the folding method described would break the vertical struts with additional hinges and fold the struts under the platform surface.

Figure 6:
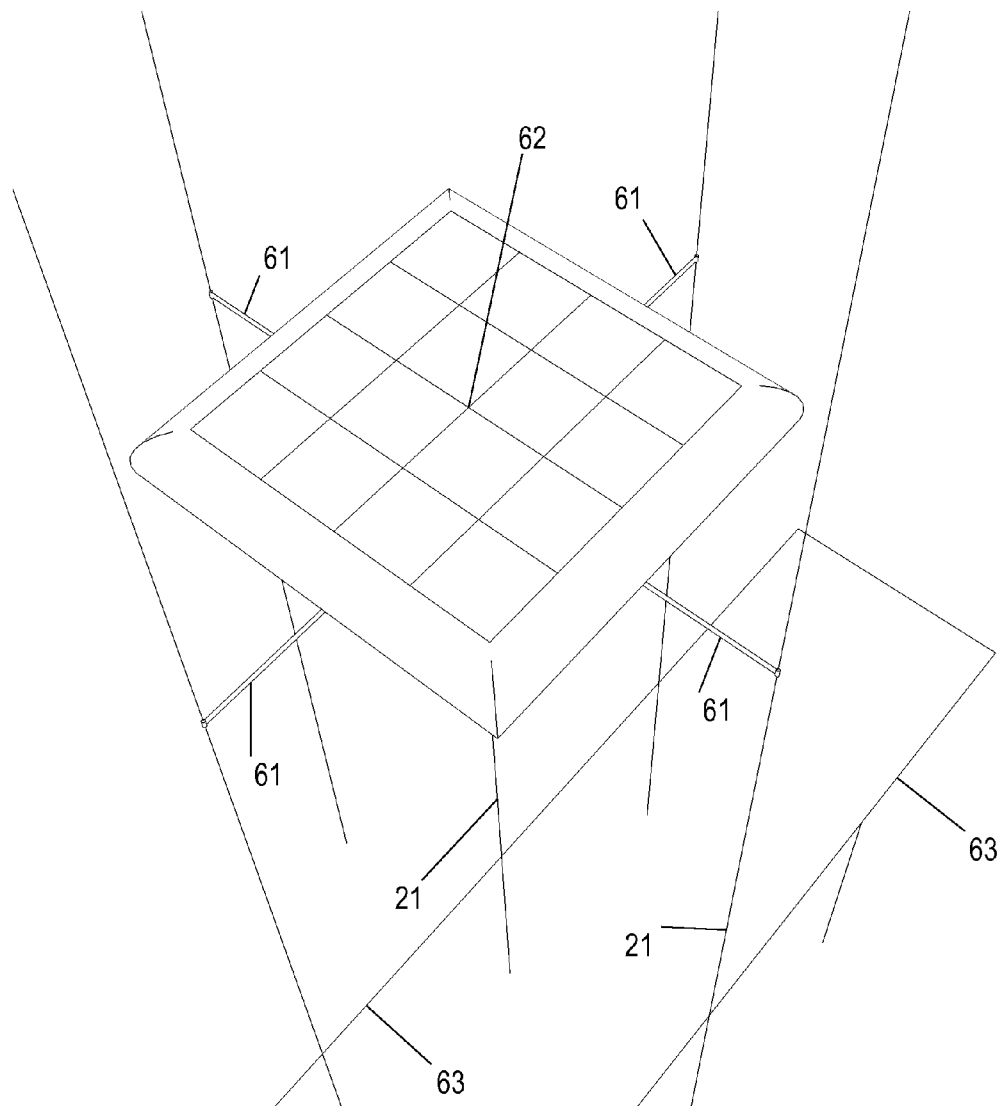
FIG. 6 is a perspective view from above of a small platform made from 16 platform modules, during vertical deployment to form part of a large platform.

FIG. 6 shows a perspective view of a small platform 62 assembled from 16 platform modules 23 as small platform 62 is deploying to altitude. This illustrates the method of deployment described in the description for FIG. 4. For clarity only the nearest neighbor tethers 21 are shown. This shows the guiding and supporting booms 61 attaching the small platform to the adjacent tethers 21. As a winch plays out the tether attached to small platform 62 the small platform rises or falls vertically in a controlled manner accurately positioned and restrained horizontally by the booms 61.

During initial assembly of the large platform, there are few deployed small platforms and supporting tethers for guidance. Unique deployment methods are required using additional cables to help guide and support deploying platforms 41 or 62.

FIGS. 7A, 7B, 7C and 7D show various perspective views describing additional stages of small platform 71 deployment described in the description of FIG. 6. In all views, most of the tethers 21 are omitted for clarity.

Figure 7A:
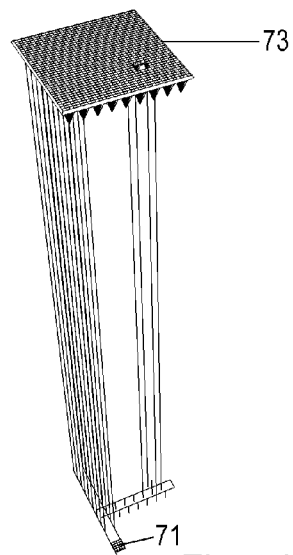
FIG. 7A is a perspective view from above of a large platform constructed from 81, small platforms, each small platform being constructed from 16 platform modules, as a small platform is being added to the large platform.

FIG. 7A shows a perspective view of a large platform 73 floating at altitude. An assembled small platform 71 is shown at the bottom, about to be deployed to altitude.

Figure 7B:
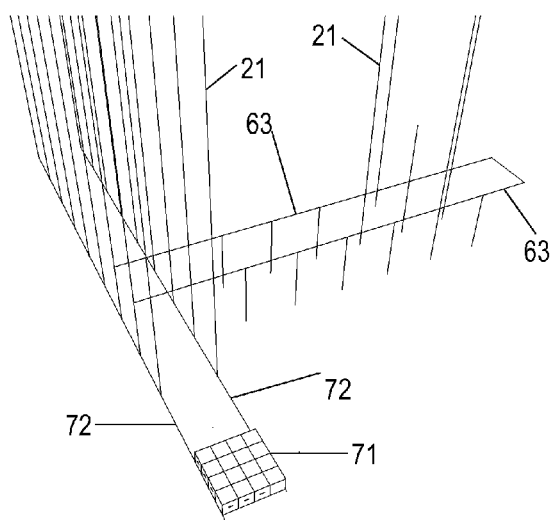
FIG. 7B is a perspective view of a close up of the bottom front left of FIG. 7A.

FIG. 7B shows a close up perspective view of small platform 71 and elements that enable its deployment. In-rails or guides 72 are used to help guide and transport small platform 71 through the space between the tethers 21 to the location of the across-rails or guides 63.

Figure 7C:
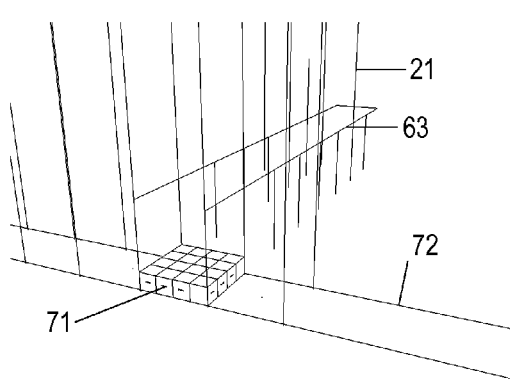
FIG. 7C is a perspective view of a stage in the deployment of the small platform.

FIG. 7C shows a perspective view of a stage of deployment of small platform 71 when it has completed its transport along in-rails 72. In this embodiment across-rails 63 are shown above in-rails 72, but they could be at the same level as in-rails 72, with either or both at ground level or elevated using the tethers 21 as support.

Figure 7D:
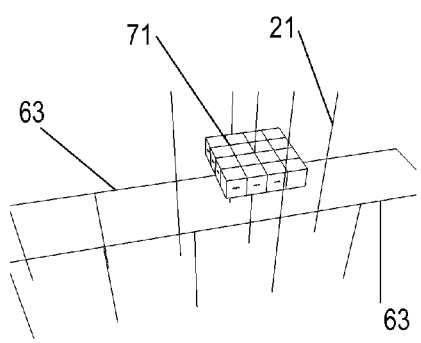
FIG. 7D is a perspective view of a subsequent stage in the deployment of the small platform.

FIG. 7D shows a perspective view of small platform 71 after it has transferred via across rails 63 to the desired tether 21 location for vertical transport. The vertical stage in deployment is shown in FIG. 6, where booms are deployed and attached to adjacent tethers 21 and aerodynamic edges are inflated.

Figure 8:
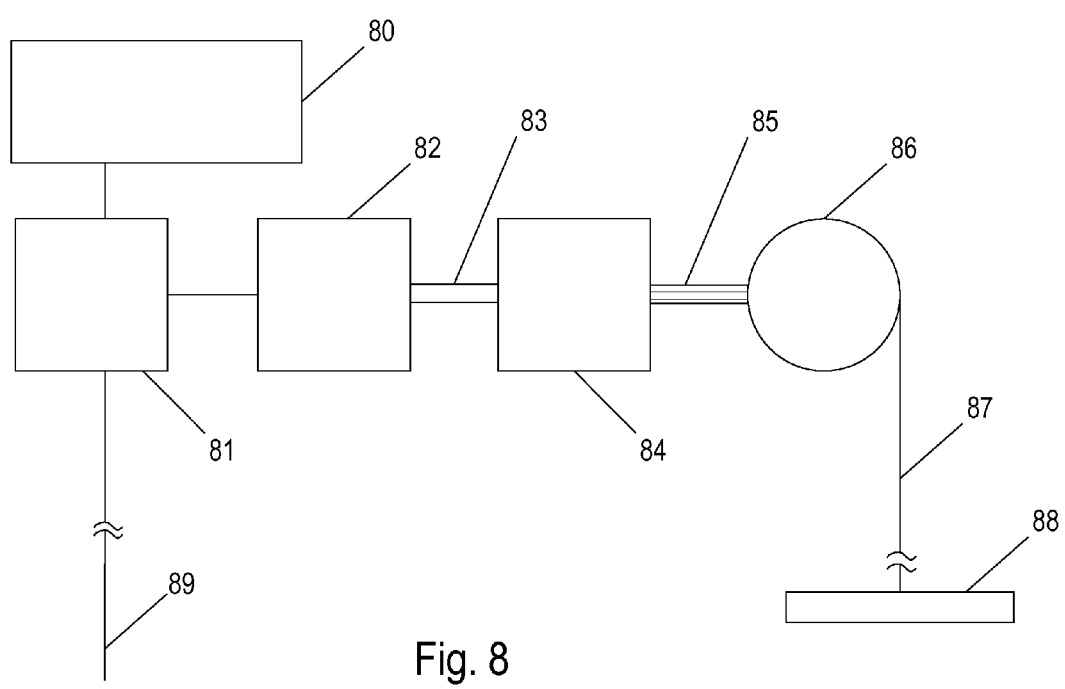
FIG. 8 is a schematic view of the mechanical and electrical elements of a gravity energy storage system using a buoyant high altitude platform.

FIG. 8 shows a schematic view of elements attached to a small platform 62 that implement gravity energy storage. PV panel array 80 is electrically connected to electrical conversion and control block 81. Electrical conversion and control block 81 is electrically connected to HV cable-tether 21 and electrical motor generator 82. Electrical motor generator 82 is mechanically connected to gearbox-brake unit 84 with shaft 83. Gearbox-brake unit 84 is mechanically connected to cable reel 86 with shaft 85. The combination of electrical motor generator 82, gearbox-brake unit 84, shaft 83, gearbox-brake unit 84, cable reel 86 and shaft 85 make a winch. Cable reel 86 holds long cable 87 which is attached to gravity storage weight 88. Cable 87 is made from strong and light material suitable for storing on reel 86. Example materials are aramid fibers such as Kevlar or ultra high molecular weight poly ethylene (UHMPE) such as Dyneema.

Figure 9A:
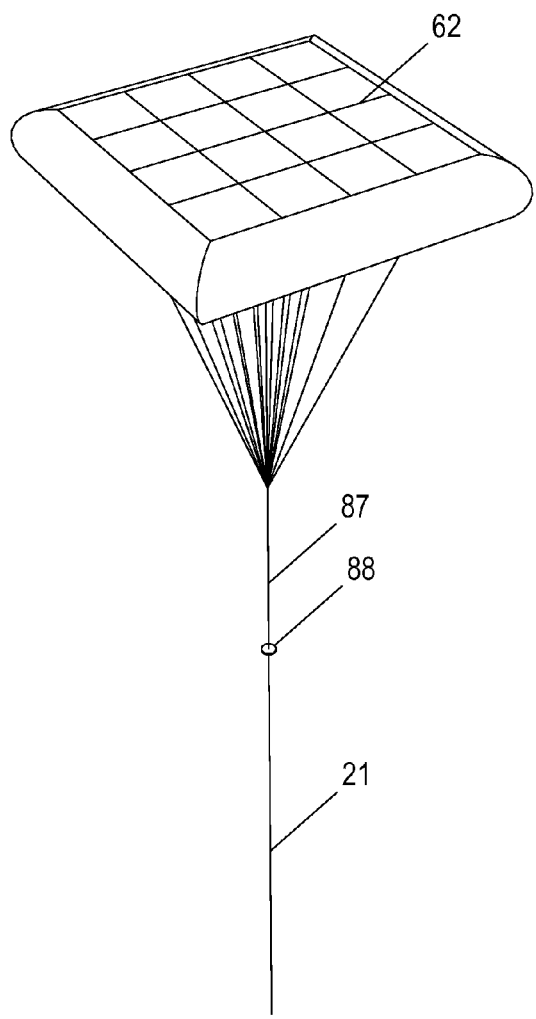
FIG. 9A is a perspective view of a gravity storage system using a small buoyant high altitude platform.
Figure 9B:
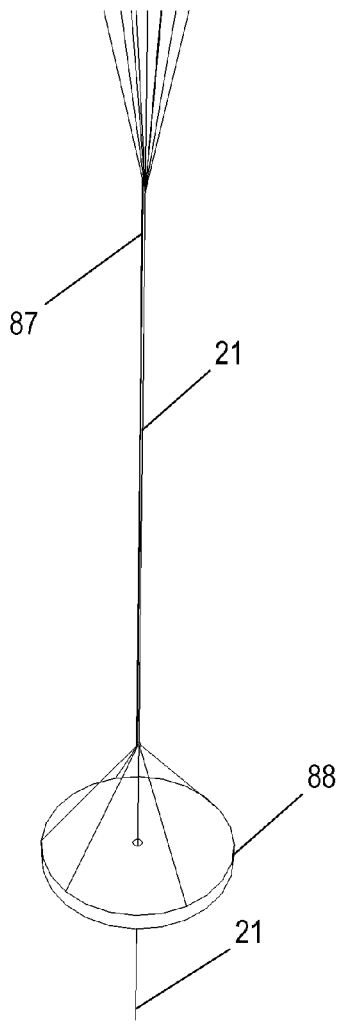
FIG. 9B is a perspective view of a close up view of a gravity storage weight shown in FIG. 9A.

FIGS. 9A and 9B show perspective views of a small platform that incorporates the gravity energy storage elements shown in FIG. 8. The PV array 80 is on the top surface of small platform 62. The electrical conversion and control block 81, and winch elements are attached to small platform 62 inside the framework and are not visible in these views. In other embodiments these elements could be deployed on a platform suspended below small platform 62 as a means to evenly distribute the mechanical load. Gravity storage weight 88 is shown in FIG. 9A and in more detail in FIG. 9B. This illustrates the relatively small size of weight 88 relative to small platform 62. The gravity storage weight 88 can be implemented as a dense solid or as a granular solid such as sand or a liquid such as water held in a container. Water and sand have the advantage in that they are easily jettisoned in an emergency such as a cable breaking, minimizing the hazard on the ground.

Figure 10:
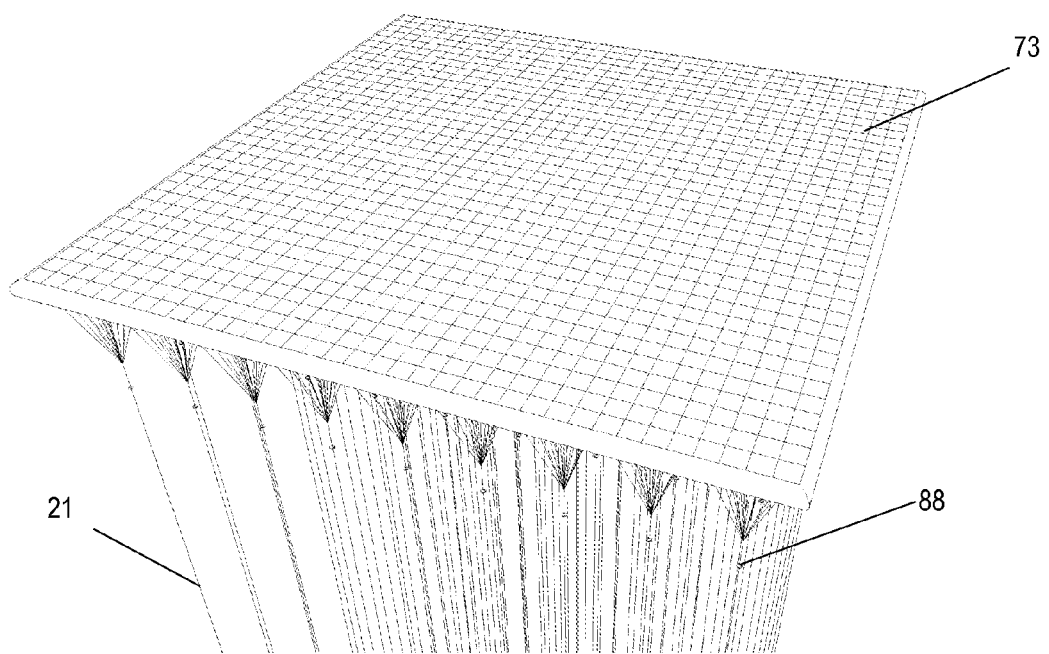
FIG. 10 is a perspective view of a large platform with gravity storage.

FIG. 10 shows a perspective view of a large platform 73 assembled at altitude from small platforms 62, each incorporating gravity energy storage. This illustrates the modular, distributed and redundant nature of high altitude gravity energy storage, with many gravity storage weights 88 and their attendant winches and cables. Systems can grow incrementally to very large storage capacity, and failure of one element has little impact on overall operation.

The magnitude of gravitational potential energy is equal to the mass multiplied by the force of gravity multiplied by the height. The gravity energy storage system described is unique in that it exploits buoyancy in the atmosphere to support a large mass and the height of approximately 20 km is much larger than the hundreds of meters height of the prior art. Platforms described can scale to support a mass of many thousands of tons, which when multiplied by the 20 km altitude results in much larger potential energy gravity storage than the prior art.

Operation

The small platforms floating tethered in the low stratosphere shown in FIGS. 3B, 3C and 3D, and the large platforms shown in FIGS. 4, and 7A operate to produce photovoltaic electricity in the manner of prior art photovoltaic power plants on the ground. The electrical elements, including photovoltaic panels, wires, combiner elements, DC-DC converters, DC-AC inverters are the same but have to be designed to operate in the unique environment in the low stratosphere, which is colder, has thinner air with low buoyancy and a low breakdown voltage, has more ozone and has higher intensity solar radiation with more UV. They also can be optimized for operation in the low stratosphere, as is the case for photovoltaic panels which don't have to handle water based weather and are exposed to much lighter mechanical loads from wind and the absence of snow, hail and ice.

When deployed and operating in the low stratosphere, the small platforms like those shown in FIGS. 3A, 3B, 3C and 3D, and the large platforms shown in FIGS. 4, and 7A operate passively to resist wind loads and atmospheric changes. The structures move under wind loads and buoyancy provides horizontal reaction forces via the tethers that counteract wind forces. The volume of gas in gas bags expands and contracts within the range of pressure changes at the deployed altitude.

Tether/HV cables 21 are also subject to extreme wind speeds in the troposphere, but their narrow diameter ensures that the aerodynamic loads are small in comparison to the worst forces on the buoyant platform and these forces are also counteracted by platform buoyancy reaction forces.

Operation also includes deployment and maintenance and repair. The physical scale of the buoyant structures shown in FIGS. 3A, 3B, 3C, 3D, 4, and 7A is larger than any prior art buoyant apparatus. The apparatus and methods that enable construction and deployment of such large scale objects is by definition new. The design of platform modules 23 is described in the description of FIG. 1 and FIG. 2. Each platform module is a fully functional self contained array of photovoltaic panels, electrical systems, structural systems, buoyancy systems and optional other use systems. This greatly facilitates the construction of larger structures from assemblies of these modular elements which simply need to be mechanically connected. The method of construction of platform modules 23 shown in FIGS. 5A, 5B, and 5C that enables all assembly work to occur at ground level greatly simplifies the construction process. The addition of appropriate hinges 51 at the vertices of platform modules 23 enables this form of construction.

The area of flat land needed along with logistical and operational difficulties make it impractical to construct, deploy and maintain very large platforms from the ground. The method of small platform deployment shown in FIGS. 6, 7A, 7B, 7C, and 7D using guide rails 63 and 72 moves the assembly process of large platforms above the ground and then to the low stratosphere. This process of deployment, maintenance and recovery of small platforms that can be reasonably assembled and repaired on the ground and joined together only in the low stratosphere makes the construction of large platforms possible. The large platforms only ever exist as such in the stratosphere. The assembly area on the ground is small and if guide rails 63 and 72 are elevated, the ground under the large array is undisturbed during operation and maintenance. Over time with proven safety and reliability, large platforms could become very large as the only additional impact on the ground with large platform growth is winches and HV distribution.

The impact of HV distribution on the ground can be reduced by using the tethers as support "towers" from which HV cables can be suspended high above the ground, perhaps at several hundred meters altitude. The distance between tethers is similar to the distance between HV towers in current art HV power distribution, so cables and equipment could easily be adapted.

With low leakage gas bags and highly reliable and redundant photovoltaic panels and electrical systems, it is likely that platforms will stay aloft for years before maintenance or repair is required. When necessary, the method and apparatus shown in FIGS. 6, 7A, 7B, 7C, and 7D allows small platforms to be winched down and repaired or replaced when it is operationally convenient.

Each small platform in the large platform can have its own tether. This, as well as allowing for maintenance and repair provides tether redundancy and ensures that mechanical loads on the platforms are evenly distributed. This in turn reinforces the modular structural design as mechanical loads are constant or reduce as the large platforms grow.

As shown in FIG. 8, FIG. 9A FIG. 9B and FIG. 10, each small platform 62 in a large platform can implement gravity energy storage. In operation, energy is stored by using electrical energy to raise weight 88 using motor/generator 82 and cable 87. The electrical energy to drive the motor generator can come from a PV array 80 on the platform or from the ground via the platform HV transmission cable-tether 21. In this manner, energy storage is not necessarily tied to PV electricity generation on the small platform 62. Stored gravity energy is recovered by allowing weight 88 to fall at a controlled rate, with attached cable 87 mechanically driving motor generator 82, thereby producing electricity. This electricity can be consumed by equipment on the small platform 62 and/or converted to high voltage DC by electrically connected power convertor controller block 8 land transmitted down HV transmission cable-tether 21.

The normal usage model envisaged is to store energy generated during daylight for use during darkness, thus following a daily charge-discharge cycle. However, storage and generation are not necessarily tied to a daily cycle, and usage can vary. For example energy stored early in the day may be recovered later, still during daylight. If small platform 62 is at 20 km altitude, and the weight is raised and lowered through the full 20 km distance, the energy stored in weight 88 is approximately 54 Watt hours per kilogram. A representative 500 tonne weight would store approximately 25,000 kilo Watt hours of gravitational potential energy.

Though not shown or discussed platform modules have systems to handle static electricity and lightning. There are instrumentation systems to monitor the electrical, structural, buoyancy systems, gas leakage, fire environmental pressure, temperature, sunlight and other variables. There are control systems to handle system deployment, fire and electrical safety systems.

Also not shown are all uses of the small or large platforms for communications or observation for civilian and military use or as a weapons platform for military use. These uses could be added to power platforms or be provided on platforms not primarily designed to provide electricity.

Advantages

The gravity energy storage system enabled by the buoyant platforms described has many advantages over prior art energy storage systems. The round trip efficiency ratio of electrical energy out to electrical energy in can easily exceed 90%. With regular maintenance, round trip efficiency will stay constant for the life of the platform which could exceed 50 years or more. Batteries in contrast diminish in energy storage capacity with use and have a short life.

The cost of the gravity energy storage is potentially considerably less than $100/kWh capital cost which can result in an added cost of less than $0.03/kWh additional cost for stored electricity. This is far lower than any current energy storage technology and sufficiently low to make electricity supplied from storage competitive with electricity generated from burning fossil fuels.

The buoyancy needed to provide gravity storage is similar to the buoyancy needed to support PV electricity generation, which makes them very compatible for providing a unified solution that delivers a continuous, uninterrupted and reliable supply of low cost electricity from solar energy.

As described, gravity energy storage can be provided in modular increments of Mega Watt size as opposed to some technologies like pumped storage that must be developed on a much larger scale. These modular increments can be aggregated to provide very large scale energy storage of many Giga Watts, far beyond any currently deployed solution.

There is no geographic constraint on gravity energy storage as described, compared to pumped hydro electric storage, compressed air storage and other large scale storage technologies. Gravity energy storage is co-located with PV energy generation and can scale and grow with PV generation in a balanced manner.

In addition to PV power generation and gravity energy storage, because of the benign weather free environment with abundant reliable solar power and clear visibility to space and a horizon exceeding 550 km radius, many synergistic new uses, either alone or in combination, are enabled and supported by large rigid buoyant tethered platforms floating in the low stratosphere. The scale of the power and payload provided and the permanent nature of the platforms enable not just new communication uses, but very large scale, very reliable, very high bandwidth very secure communications networks. For example the whole land area of the mainland united states could be covered with approximately fourteen platforms. Each platform could communicate with neighboring platforms via laser or radio, with spacecraft with laser or radio, and with the ground via secure fiber optic cables. If platforms are deployed near all major urban areas to provide photovoltaic electricity, there will be several hundred platforms in the US and communications networks supported by them would be highly redundant. The coverage area from each platform for radio communications would match that of thousands of cell phone towers, with fewer dead zones. The line of sight visibility could enable the use of higher frequency radio bandwidth.

Because of exposure to more solar energy and the cold operating environment that increases the efficiency of many solar cell technologies, the photovoltaic electric power output is many times that of a same sized prior art ground system. This means the cost of the electricity produced is lower.

Power output is high at high latitudes, and is not affected by clouds, dust, or bad weather. This is of particular benefit to normally cloudy northern and mid latitude locations where most large urban areas are located.

The combination of geographic flexibility and power generation without the need for any fuel provides a secure and clean energy system.

Power in the form of electricity can be provided at any point on the earth's surface, where the definition of surface includes the entire surface, including all land and oceans. Offshore platforms, or platforms that straddle land and ocean could be a particularly convenient in some locations. electricity could be provided near mines, allowing convenient processing without transportation of bulk ores.

The small amount of land area needed means that systems can be located very near existing power plants, or existing transmission and distribution networks, which reduces or eliminates the need for new electricity transmission infrastructure.

Systems can scale to very large size. This means that fewer platforms are needed which reduces the impact on aircraft and airspace.

Because the land and environmental impact is small, the platforms use commonly available materials that have no resource or manufacturing constraint and the generated electric power is low cost, the systems can scale to provide all needed energy.

The manufacture of synthetic fuels for transportation and long term energy storage using the cheap electricity from the platforms provides a complete energy solution for all current uses.

Energy systems that do not put carbon dioxide into the atmosphere are highly desirable. Currently all alternative energy systems suffer from major problems:
1) They are very costly to build
2) They are unreliable providers of electricity due to intermittent weather effects, and so need backup generation using alternate energy sources such as natural gas.
3) They need large additional energy storage and transmission infrastructure investments.
4) The most abundant energy is located far from users, again requiring large transmission infrastructure investments.
5) They require large areas of land which increases their environmental impact and limits their use to areas where both energy and land are available.

This new system has the benefit of not producing carbon dioxide and has none of these problems. The bottom line is clean secure energy can be provided at much lower cost and minimal environmental impact.

The benefits of suspending an array in the stratosphere are the reliability of the energy source, the higher incident energy density, and the benign stable calm low wind weather free environment that enables permanent tethering. These benefits come at the price of lower atmospheric density, which means less buoyant lift and a consequent need for a large lightweight structure.

The modular manufacturing and deployment methods described greatly reduce cost, improve quality, and speed construction. It is envisaged that when production is mature, complete utility size electricity generating facilities could be operational in less than a year from breaking ground. This compares with current technologies which require three to five or more years to construct.

Although the present invention has been described in terms of a first embodiment, it will be appreciated that various modifications and alterations might be made by those skilled in the art without departing from the spirit and scope of the invention.

The invention should therefore be measured in terms of the claims which follow.

What is claimed is:

1. A system for storing and releasing energy from a platform in the low stratosphere comprising: a buoyancy component having sufficient buoyancy to retain said platform in said low stratosphere, said platform attached to a first end of a tether, said tether attached to the ground at a second end of said tether, a winch, said winch having a motor and a generator operatively coupled to a tension member, said tension member further coupled to a weight, said winch capable of adjusting a position of said weight with respect to said winch by raising and lowering said weight by said tension member when said system is in said low stratosphere, said winch configured for receiving energy from an external source to power said winch motor and raising said weight, and using said energy to store potential energy resulting from said weight to produce electricity by permitting said weight to fall at a controlled speed to mechanically drive said generator.

2. A system of claim 1, wherein said external source comprises energy from a photovoltaic panel positioned on said platform.

* * * * *